C. H. PRICE.
NUT LOCK.
APPLICATION FILED SEPT. 11, 1907.
No. 904,360.
Patented Nov. 17, 1908.
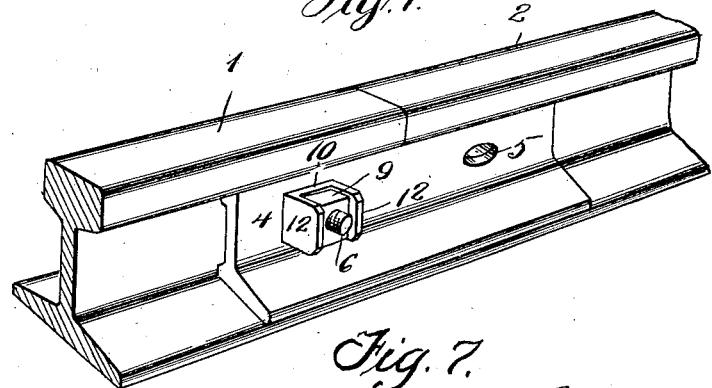
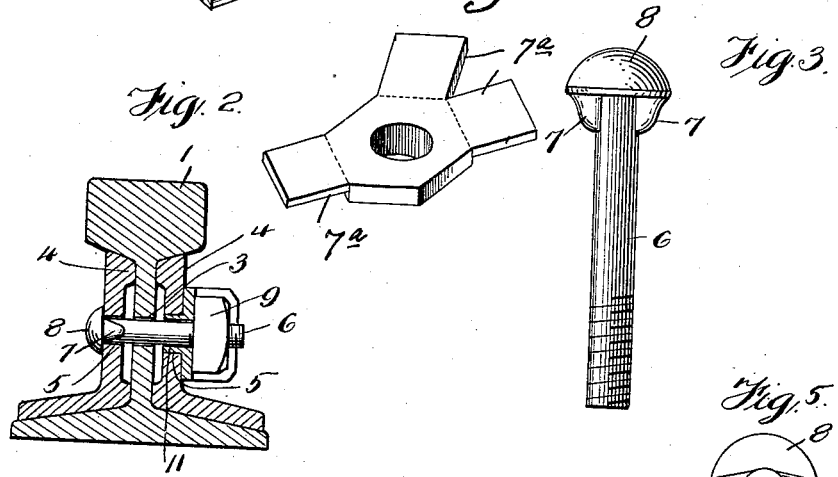
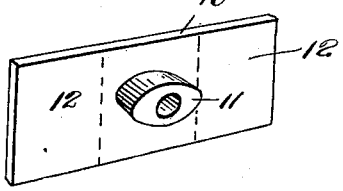
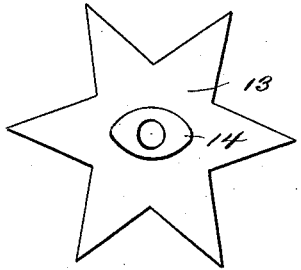
Witnesses
Samuel Payne
O. H. Butler
Inventor
C. H. Price
By
H. C. Evert Co.
Attorneys

UNITED STATES PATENT OFFICE.

CHARLES H. PRICE, OF FINLEYVILLE, PENNSYLVANIA.

NUT-LOCK.

No. 904,360.  Specification of Letters Patent.  Patented Nov. 17, 1908.

Application filed September 11, 1907. Serial No. 392,288.

*To all whom it may concern:*

Be it known that I, CHARLES H. PRICE, a citizen of the United States of America, residing at Finleyville, in the county of Washington and State of Pennsylvania, have invented certain new and useful Improvements in Nut-Locks, of which the following is a specification, reference being had therein to the accompanying drawing.

This invention relates to nut locks, and its object is, to provide simple and efficient means for preventing the loosening of a nut.

The invention is primarily designed for use upon rail joints, and its construction will be fully described hereinafter, in connection with the accompanying drawing which forms a part of this specification, and its features of novelty will be set forth in the appended claims.

In the drawing: Figure 1 is a view in perspective of a rail joint with my improved nut-lock applied thereto, Fig. 2 is a transverse vertical section of the same, Fig. 3 is a side elevation of the bolt forming a part of the invention, Fig. 4 is a perspective view of the plate which embraces the nut, Fig. 5 is an end elevation of the bolt, Fig. 6 is an elevation of a modified form of locking plate, and Fig. 7 is a perspective view of another modified form of locking plate.

The reference numerals 1 and 2 designate the meeting ends of two sections of railway rails formed with bolt-holes 3 and connected by fish-plates 4 formed with oval openings 5 registering with the bolt-holes of the rails.

The fish-plates 4 are secured to the rails by bolts 6 each provided with lugs 7 adjacent to the head 8 of the bolt. Each of the bolts 6 is secured by a nut 9 and the nuts are secured by a locking plate 10 formed with an oval-shaped boss 11 fitting the opening in one of the fish plates. The boss 11 is of the same thickness as the fish plate so that the inner edge of the boss will be flush with the inner face of the fish plate. The boss is of such size as to snugly fit the opening in the fish plate and furthermore the boss is of greater thickness than the thickness of the locking plate. After the plate 10 has been applied, the ends 12 are bent upwardly to embrace the opposite sides of the nut, thus preventing the turning of the nut, and insuring a firm and secure connection of the rails.

In the modification shown in Fig. 6 the locking plate 13 is in the form of a six-pointed star, adapting it for use with a nut of hexagonal form.

The modification illustrated in Fig. 7 is in the form of an ordinary washer, having side flanges 7ª which are bent upwardly to embrace the sides of the hexagon nut. The plate 13 is formed with an oval-shaped boss 14 to adapt it to fit the opening in one of the fish-plates.

The improvement provides a lock nut of inexpensive but effective construction, especially well adapted for connecting the fish-plates of railway rails.

Having fully described my invention what I claim and desire to secure by Letters Patent is, The combination with the meeting ends of a rail section formed with bolt receiving openings, of fish plates mounted against said sections and one of which is provided with an oval-shaped opening, a locking plate having a circular opening and further provided on its inner face with a continuous oval-shaped boss snugly fitting the oval-shaped opening in said fish plate, said boss having a circular opening which forms a continuation of the opening in the locking plate, said boss of the same thickness as the fish plate so that the inner face of the boss will be flush with the inner face of the fish plate, the diameter of the boss being such that the periphery thereof will engage throughout the wall of the opening in the fish plate, the thickness of the boss being greater than the thickness of the locking plate, said locking plate further provided with bendable ends to form arresting ears, a headed bolt extending through the fish plates, a rail section, boss and the locking plate, and a nut mounted upon the bolt and abutting against the locking plate and adapted to be engaged by the bent ends of the locking plate.

In testimony whereof I affix my signature in the presence of two witnesses.

CHARLES H. PRICE.

Witnesses:
 MAX H. SROLOVITZ,
 A. J. TRIGG.